(12) United States Patent
Chen

(10) Patent No.: US 6,733,210 B2
(45) Date of Patent: May 11, 2004

(54) DEVICES OF PROVIDING EFFICIENT REVEGETATION AND GREENING STRUCTURES FOR LANDSCAPING AND DECORATION

(76) Inventor: Shu-Sheng Chen, No. 11, Lane 45, Yu-Ying St., Chingmei, Taipei (TW), 117

( * ) Notice: Subject to any disclaimer, the term of this patent is extended or adjusted under 35 U.S.C. 154(b) by 0 days.

(21) Appl. No.: 10/226,145

(22) Filed: Aug. 23, 2002

(65) Prior Publication Data

US 2003/0044242 A1 Mar. 6, 2003

(30) Foreign Application Priority Data

Sep. 4, 2001 (TW) ....................... 90215101 U

(51) Int. Cl.⁷ .............................. E02D 17/20; A01G 9/02
(52) U.S. Cl. ..................... 405/302.6; 405/303; 47/65.5; 47/46; 47/67; 47/82
(58) Field of Search ................... 405/15, 16, 302.6, 405/302.7, 303; 47/46, 47, 65.5, 65.7, 66.5, 67, 82, 83

(56) References Cited

U.S. PATENT DOCUMENTS

| | | | | |
|---|---|---|---|---|
| 1,084,414 A | * | 1/1914 | Eger | 47/68 |
| 4,295,296 A | * | 10/1981 | Kinghorn | 47/82 |
| 4,380,136 A | * | 4/1983 | Karpisek | 47/83 |
| 4,622,777 A | * | 11/1986 | Greene, Jr. | 47/67 |
| 4,896,456 A | * | 1/1990 | Grant | 47/67 |
| 6,305,875 B1 | * | 10/2001 | Matsumoto | 405/302.7 |

FOREIGN PATENT DOCUMENTS

| | | | |
|---|---|---|---|
| FR | 2601552 | | 1/1988 |
| FR | 2602639 | | 2/1988 |
| GB | 2055281 | * | 3/1981 |
| GB | 2078072 A | | 1/1982 |
| GB | 2157143 A | | 10/1985 |
| GB | 2171582 A | | 9/1986 |
| GB | 2238221 A | | 5/1991 |
| GB | 2239155 A | | 6/1991 |
| GB | 2329315 A | | 3/1999 |
| GB | 2330511 A | | 4/1999 |
| JP | 4143317 A | | 5/1992 |
| JP | 11181775 A | | 5/1999 |
| JP | 2001125668 A | | 5/2000 |
| JP | 20024289 | | 1/2002 |

* cited by examiner

*Primary Examiner*—Jong-Suk (James) Lee
(74) *Attorney, Agent, or Firm*—Bacon & Thomas

(57) ABSTRACT

A revegetation and greening system is used to control erosion and to decorate infertile environments or steep structures. This system comprises one or many revegatation devices. Each device holds self-sufficient materials for growing plant with minimal need for frequent watering or advanced care. A layer of synthetic nets or grids can be placed on the surface of these structures to secure these devices. This system creates a stable and suitable environment for the growth of many plants in various conditions. Furthermore, by using many layers of this system simultaneously, it can provide erosion control and structure decoration in a very short time.

15 Claims, 12 Drawing Sheets

DEVICES OF PROVIDING EFFICIENT REVEGETATION AND GREENING STRUCTURES FOR LANDSCAPING AND DECORATION

FIELD OF THE INVENTION

The present invention relates generally to the revegetation and decorating system that provide revegetation in demanding locations and environments. This system comprises one or many revegetation devices. These devices are comprised of bags with high tensile strength holding self-sufficient materials for plant life. The present invention reduces the need for frequent care and minimizes the failure of plant growth due to harsh environmental conditions, while providing stable and suitable environments for plant life. These devices further provide rapid erosion control and surface decoration when layers of Green Deco system are applied simultaneously.

BACKGROUND OF THE INVENTION

Environmental Protection has become an important issue in the world. Most developed countries have attempted to reduce building ugly concrete and/or brick walls and slopes, and to use more environmental friendly Geotextiles reinforcement for walls and slopes. However, in some situations, the concrete slopes, concrete or brick walls cannot be avoided due to safety concern. These environmental architectural situations have made many investors reluctant to purchase the surrounding properties. Therefore, local governments receive frequent complains from the local residents.

Up to now, to improve the visual effects of these environmental eyesores caused by concrete slopes, concrete and/or brick walls, some people tried to put vegetation down the bottom of the wall, with the hope that the plant will grow and ultimately cover the wall. However, this method of attempted vegetation growth frequently fails due to the long period needed to complete the planned plant growth height, and by the vegetation being killed by the heat that is naturally generated from within the concrete.

For steep rock and/or soil slopes, many people use shotcrete, concrete, and high strength geosynthetic net to increase the slope safety. For the same environmental reasons, geosynthetic net has now become more popular. Due to safety concerns in steep rock and/or soil slope areas, people have to use high strength, low creep, and high density geosynthetic nets. Unfortunately, it has been my experience that most of the vegetation will have difficulty passing through the geosynthetic nets from the bottom due to the high density of the geosynthetic nets. Although some vegetation may pass through the nets, the stem of vegetation growth will be limited due to the low creep and high density of the geosynthetic net. Furthermore, some people even want to use hydromulching in this area. However, many seeds may be carried away due to the steep slope, heavy wind or rain. The result is that the original expectation for vegetation growth is seldom realized.

In addition, for some large scale or remote projects, watering the vegetation after the construction can become a very difficult and costly endeavor.

Finally, a new revegetation and greening system has been invented by the inventor to solve the above mentioned problems. This system comprises single or multiple revegetation devices. Each device holds self-sufficient materials for growing plant with minimal need for frequent watering or advanced care. A layer of synthetic nets or grids could be placed on the surface of structures to secure these devices. This system creates a stable and suitable environment for the growth of many plants in various harsh conditions. Furthermore, by using many layers of this system simultaneously, it would provide erosion control and structure decoration in a very short time.

SUMMARY OF THE INVENTION

In accordance with one aspect of the present invention, a revegetation and greening system comprises one or many revegetation devices with an opening on the top and a water-retaining tank at the sealed bottom; internal materials in the device including plant seeds or little plants, dry weed or wood fiber, fertilized soil, and water-holding polymer; a fastening device comprising a layer of synthetic nets or grids, which could be placed on the surface of structures and one or more fastening members, which could be used to attach the revegetation bags or devices to the synthetic nets or grids. The synthetic nets or grid could be attached on concrete or brick walls, concrete slopes, steep rock or soil slopes, buildings, and walls of metal houses or fences by any commonly used methods.

In accordance with another aspect of the present invention a revegetation and greening system comprises one or many revegetation devices with an opening on the top and a water-retaining tank at the sealed bottom; internal materials in the device including plant seeds or little plants, dry weed or wood fiber, fertilized soil, and water-holding polymer; rope or tape, used for connecting and fastening revegetation bags or devices on the structures, such as bridge, column or fence, or by any other commonly known methods.

In accordance with yet another aspect of the present invention a revegetation and greening system comprises one or many revegetation devices with an opening on the top and a water-retaining tank at the sealed bottom; internal materials in the device including plant seeds or little plants, dry weed or wood fiber, fertilized soil, and water-holding polymers; rope or tape, used for connecting revegetation bags or devices; fixing members, used to attach the rope or tape on the structures, such as a building wall, or by any other commonly known methods.

In accordance with still another aspect of the present invention, a revegetation and greening system comprises one or many revegetation devices with an opening on the top and a water-retaining tank at the sealed bottom; internal materials in the device including plant seeds or little plants, dry weed or wood fiber, fertilized soil, and water-holding polymers; slender plastic or metal pieces with a single top hole and several lower holes used to fixed itself on the back of revegetation bags or devices by a few synthetic tapes; fixing members that can pass the top hole of the slender plastic or metal piece and fix revegetation bags or devices on the building wall.

In accordance with yet another aspect of the present invention, a revegetation and greening system comprises one or many revegetation devices with an opening on the top and a water-retaining tank at the sealed bottom; internal materials in the device including plant seeds or little plants, dry weed or wood fiber, fertilized soil, and water-holding polymers; two clip rings, arranged at either vertical or horizontal alignment by a few sewed synthetic tapes. The revegetation bags or devices can be fixed on a fence by opening and then closing the clip rings.

In general, the present invention, a revegetation and greening system, can raise vegetation within various environmental conditions like concrete slopes, concrete or brick walls, steep rock or soil slope, buildings, or walls of metal houses. In addition, the system can also naturally decorate the old tile of building that normally uses much costly materials and other more time consuming methods such as demolition, replacement, and/or renovation. Even for the new tile of buildings, with an optimum water cement ratio, the present invention, a revegetation and greening system, can raise vegetation directly on the building. The benefit to growing vegetation on tile is not only to provide a more attractive scenery, but it also helps to reduce the interior temperature and helps to save electrical costs. In addition, the present invention, a revegetation and greening system, can also decorate and produce a natural and protective sound barrier for places like the walls of tennis courts, fences, and the like.

In order to make the purpose, structure, and superiority of the present revegetation and greening system of the invention easier and clearer to understand, I will use the following below cases and figures to explain more.

DETAILED DESCRIPTION OF THE PREFERRED EXEMPLARY EMBODIMENTS

Figure 1:
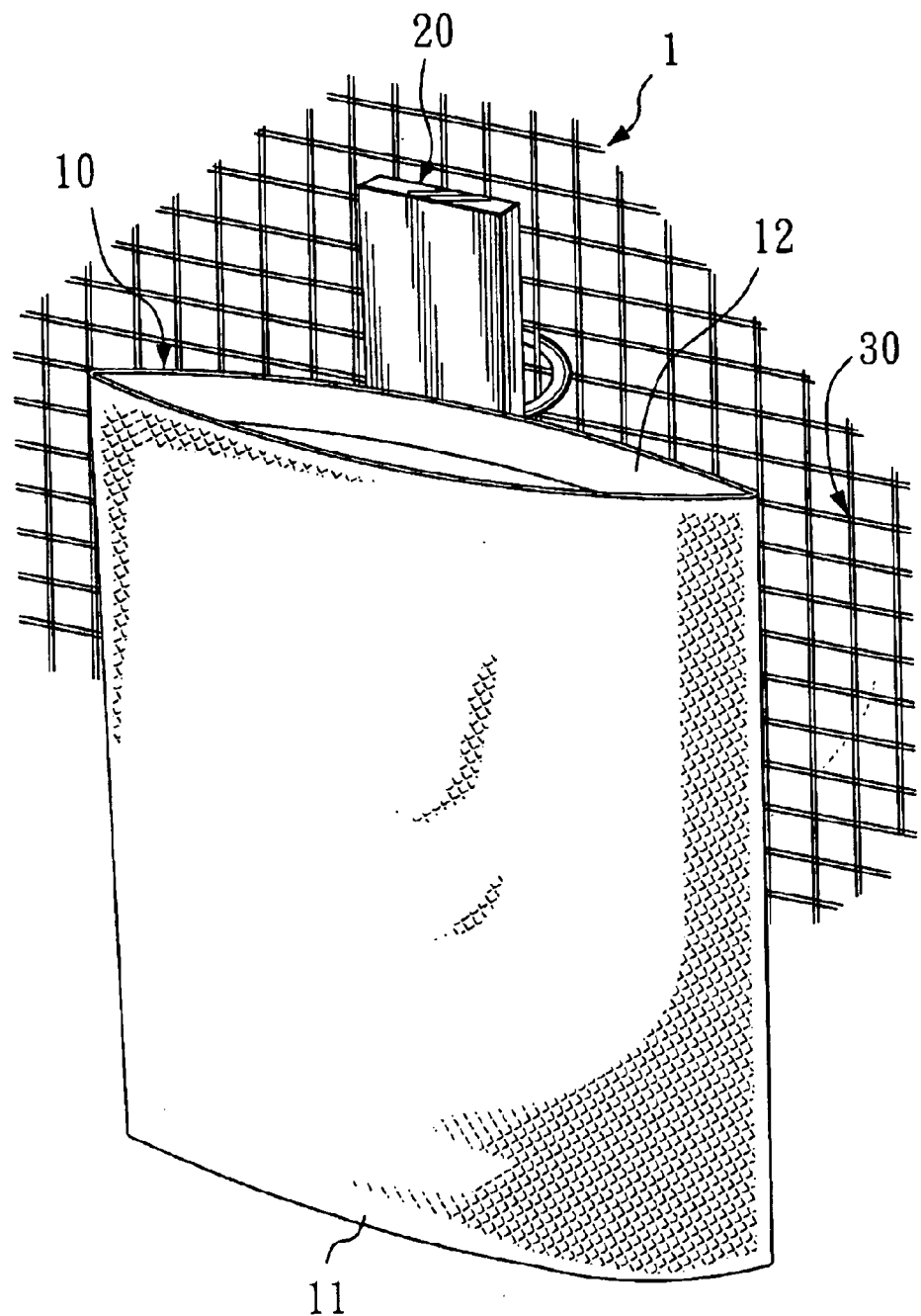
FIG. 1 depicts a first case to use one of the present invented revegetation and greening device on steep wall.
Figure 2:
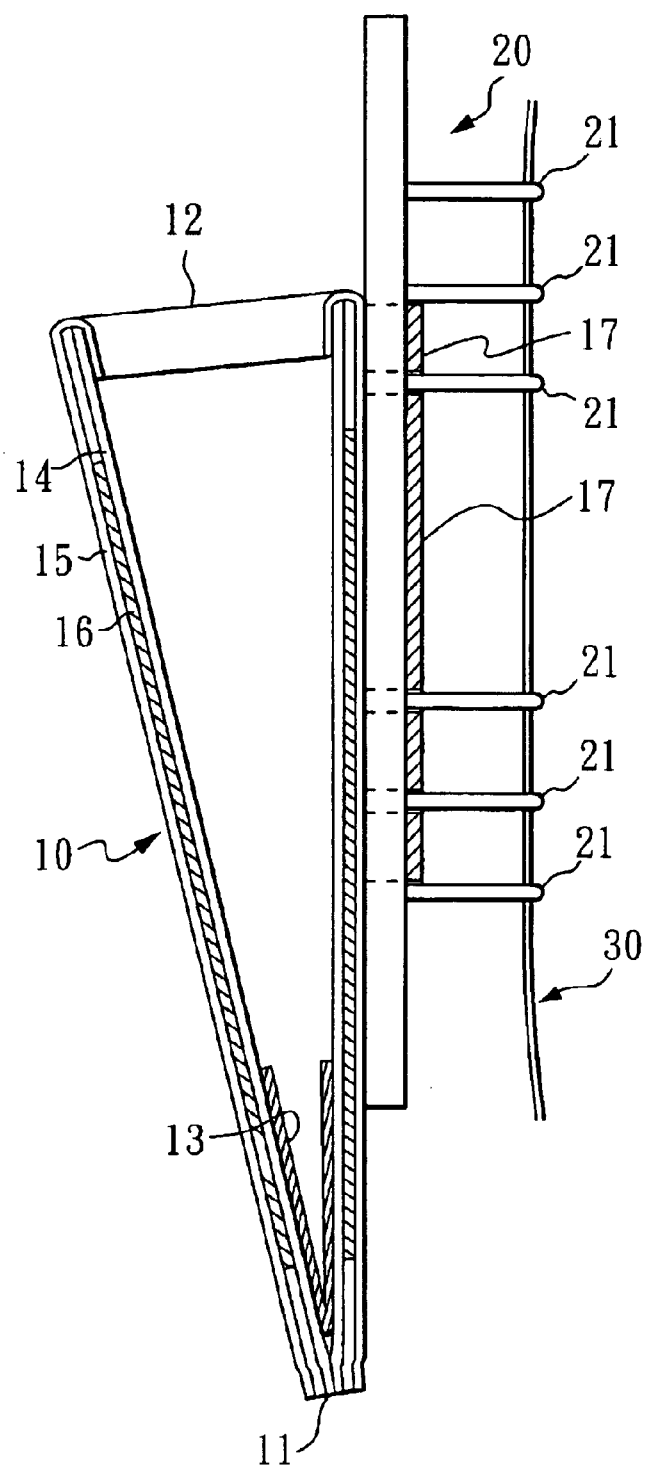
FIG. 2 depicts a longitudinal sectional view of device in FIG. 1.

FIGS. 1 & 2 depict separately a first case to use one of the present invented revegetation and greening device on steep wall and the longitudinal sectional view of the device. The revegetation and greening system comprises one or many revegetation devices 10, one or many clip-fastening members 20 which just like the clip in the common file holder shown in the drawing and one synthetic net or grid 30. To simplify the drawing, there are only one revegetation device 10 and one clip-fastening member 20 shown on the drawings. The revegetation device 10 can be secured on the synthetic net or grid 30, been fixed on steep wall by any known method, by the clip-fastening member 20.

The revegetation device 10 with an opening 12 on the top and a sealed bottom 11; The opening 12 can not only collect soil and seed carried by wind or rain, but also increase the water-absorbing ability.

The revegetation device 10 is made of internal nonwoven textiles 14 and external synthetic textiles 15 with an intercalated layer of thermal isolator 16. The synthetic textiles 15 are textiles manufactured by Nylon, Polypropylene, Polyethylene, or Polyester materials. The thermal isolators 16 (for example, Polylone) can reduce the high heat been transferred into the inside soil. Then the water-holding function will be increased and the chance for the plant being burned by the heat emitted from the concrete will be minimized which will result in the temperature inside the device being more stable.

Besides, there is an impermeable water-retaining tank 13 at the sealed bottom 11 in the revegetation device 10. The water-retaining tank 13, with 1~5 cm in depth, can not only accumulate the appropriate amounts of rainwater, but it also acts as a channel so that the extra rainwater overflows in order to prevent the inside soil from retaining too much water. The survival rate of the vegetation will increase dramatically.

The internal materials in the device 10 include plant seeds or little plants, dry weed or wood fiber (not shown in the drawing), fertilized soil, and water-holding polymer (or natural water-holding plant gel). The dry weed or wood fiber could be placed on the top and inside the water-retaining tank 13 in revegetation device 10 to keep the inside temperature and humidity stable and out of the sunlight. The sprout and survival rate of the vegetation will increase by using this method. The dry weed or wood fiber will eventually become natural fertilizers during its decomposition. The water-holding polymer (or natural water-holding plant gel) could be added directly into the soil, contained by a small plastic container (or bag) to raise the water-holding and supply function.

The revegetation device 10 is a compact size design. It may range between 5 cm and 30 cm in height and width depending on the vegetation types and locations. The substantially V-shaped longitudinal section, which can guide the current and reduce wind resistance. Besides, the appropriate amount of soil will provide enough nutrition for the vegetation growth, but will not overweigh or tear down the synthetic net or grid. The types of synthetic net or grid that can be used will expand dramatically.

Figure 4:
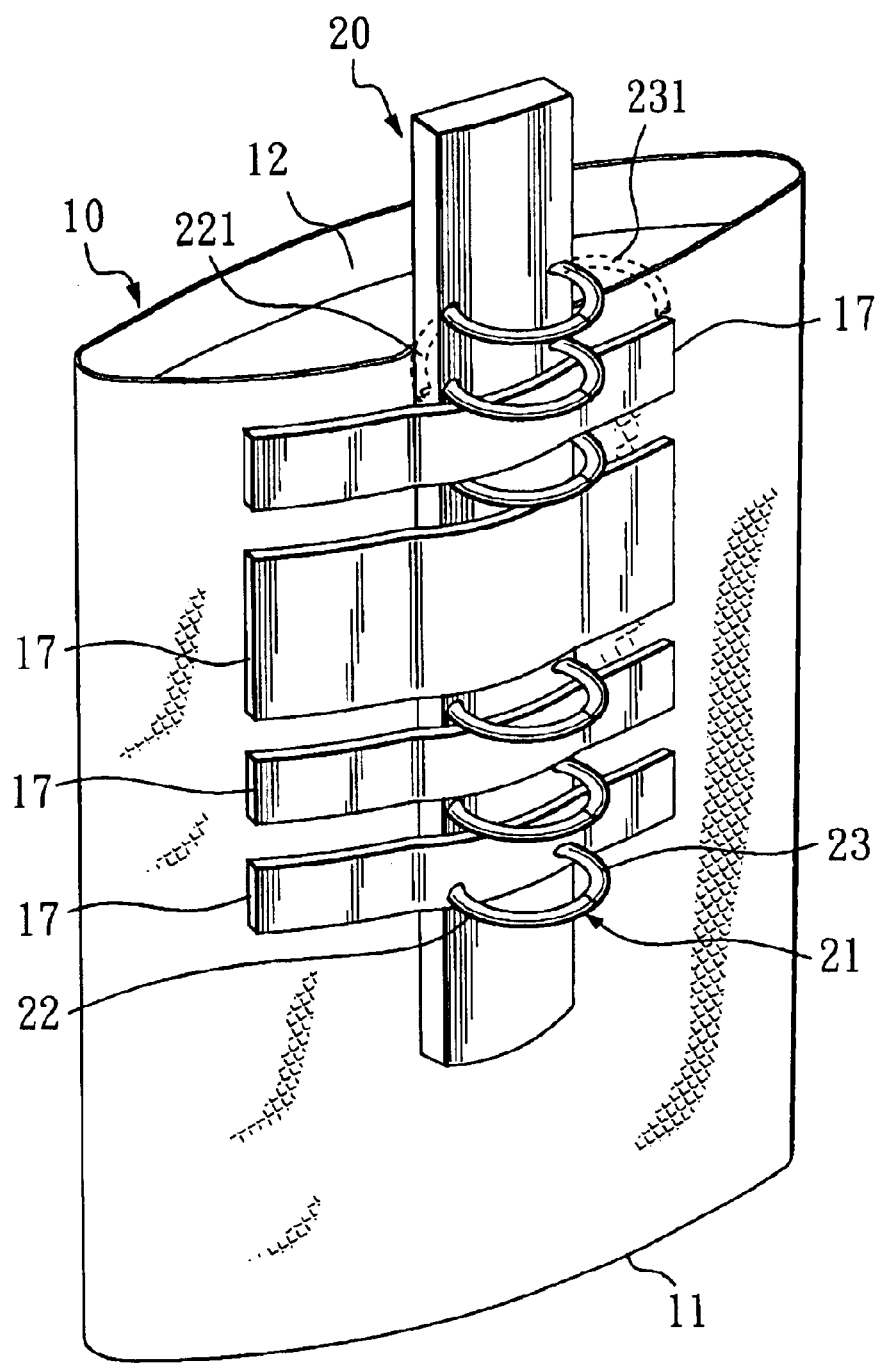
FIG. 4 depicts a clip-fastening device that can be easily fixed with an over-the-top configuration to the back of revegetation bags or devices by synthetic textile tapes.

FIG. 4 depicts the enlarged view of a clip-fastening member 20 that resembles the clip in the common file holder. This clip contains at least two rings 21 and each ring 21 comprises two half rings 22, 23 that can be opened (please refer to the dot line). Since the clip-fastening member 20 is a common device, there will be no need to further explain. The clip-fastening device can be easily fixed with an over-the-top configuration to the back of revegetation bags or devices by synthetic textile tapes 17. There are two reasons to use over-the-top configuration (over 2~8 cm). First, it can allow the worker to quickly and easily assembly them by a hand. Second, it provides a small section that will allow a small amount of vegetation to climb upward. This will reduce the possibility of vegetation burning due to the heat generated from within the concrete. This method will dramatically increase the survival rate of the vegetation.

The revegetation device can be secured on the synthetic nets or grid 30 by first opening and inserting the half rings 22, 23 into the synthetic nets or grid 30, then closing the half rings 22, 23. In fact, as shown on FIG. 4, the pair of free ends 221, 231 may not be a closed type, but a cross type. There are two reasons to use clip-fastening device. First, it has multiple fastening points to spread out the stress into the synthetic nets or grid 30. Therefore, the failure possibility of synthetic nets or grid 30 will be reduced. Second, we can use a few clip-fastening device when special, large size revegetation device are planning to be used.

Figure 3:
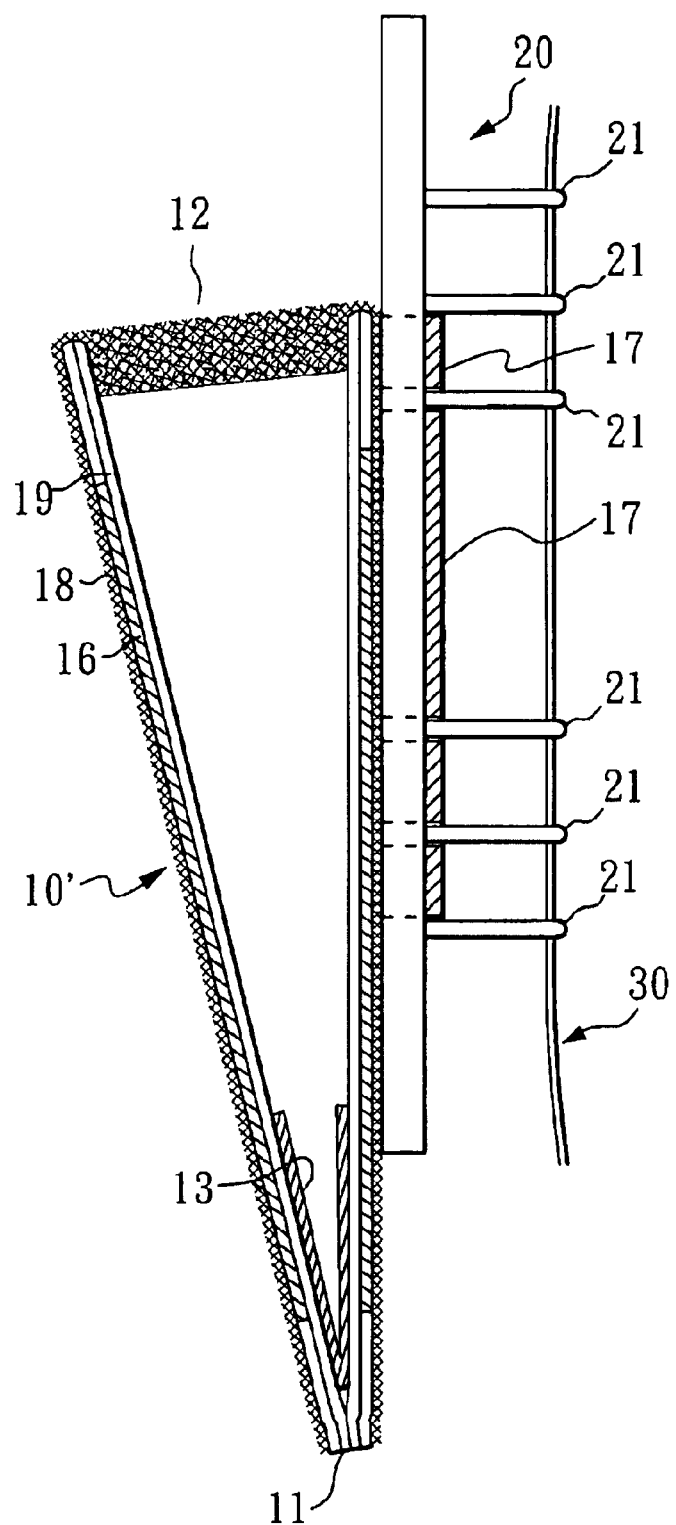
FIG. 3 depicts a longitudinal sectional view of alternatively device.

FIG. 3 depicts the longitudinal sectional view of alternatively revegetation device 10' made of internal nonwoven textiles 19 and external geosynthetic textiles 18 with an intercalated layer of thermal isolator 16. Besides, there is also an impermeable water-retaining tank 13 at the sealed bottom 11.

The advantages of using the nonwoven and synthetic textiles, or nonwoven and geosynthetic textiles are not only that it retains most of the soil, seed or vegetation inside, but also that it allows the outside water to refill inside.

Figure 5A:
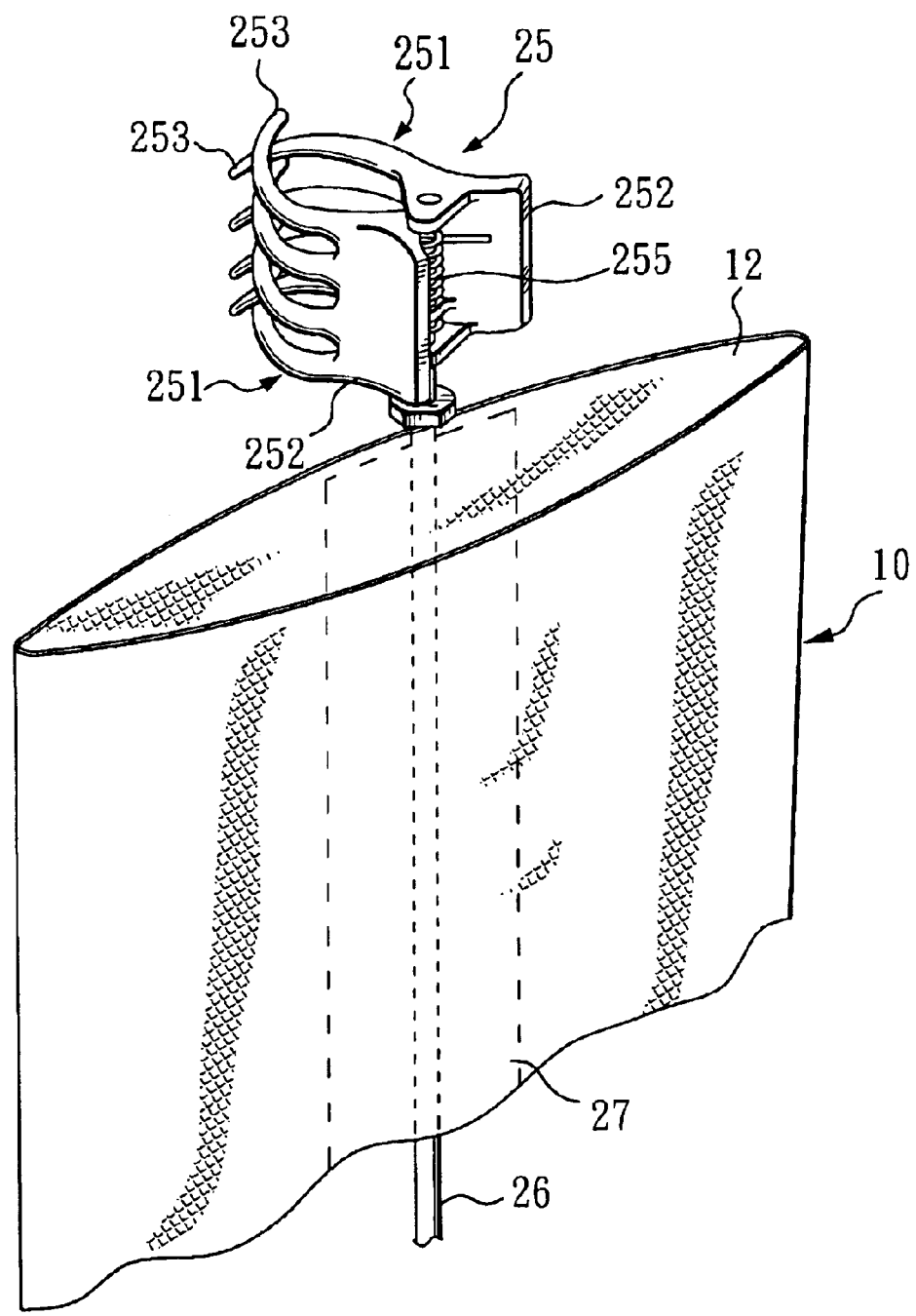
FIG. 5A depicts a spring type clip-fastening device that can be easily fixed with over-the-top and under-the-bottom configurations to the back of revegetation bags or devices by synthetic textile tapes. There is only upper part shown on the drawing.
Figure 5B:
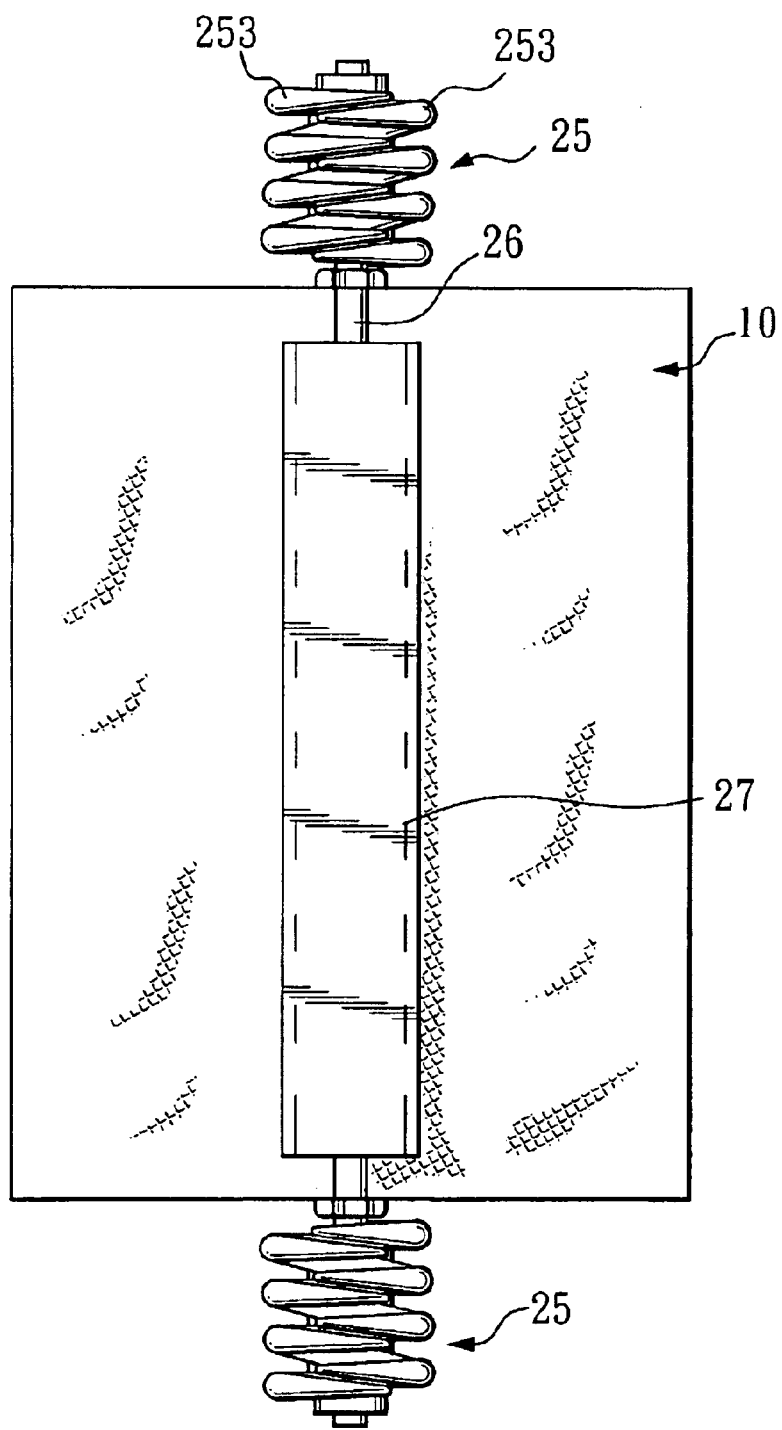
FIG. 5B depicts the back view of the spring type clip-fastening device shown in FIG. 5A.

Besides, as shown in FIGS. 5A & 5B, we could use another spring type clip-fastening member 25 that is a common device in the market. The clip-fastening member 25 can be secured on the top and the bottom of a center column 26 (please refer to FIG. 5B). The center column 26 can be easily fixed with over-the-top and under-the-bottom configurations to the back of revegetation bags or devices by synthetic textile tapes 27. The clip-fastening member 25 contains two pinned half pieces 251 secured on the twist spring 255. The twist spring 255 is secured on the center column 26. There are push part 252 and teeth part 253 on the half piece 251. In normal conditions, the teeth part 253 stays close. Since clip-fastening member 25 is a common device, there will be no further explanation needed. Pushing part 252 will make teeth part 253 open. The revegetation device can be secured on the synthetic nets or grid by opening teeth part 253, inserting into synthetic nets or grid, and then closing the teeth part 253.

The revegetation device can also be fixed on the synthetic nets or grid 30 by S-type hook (not shown on the drawing).

Figure 6A:
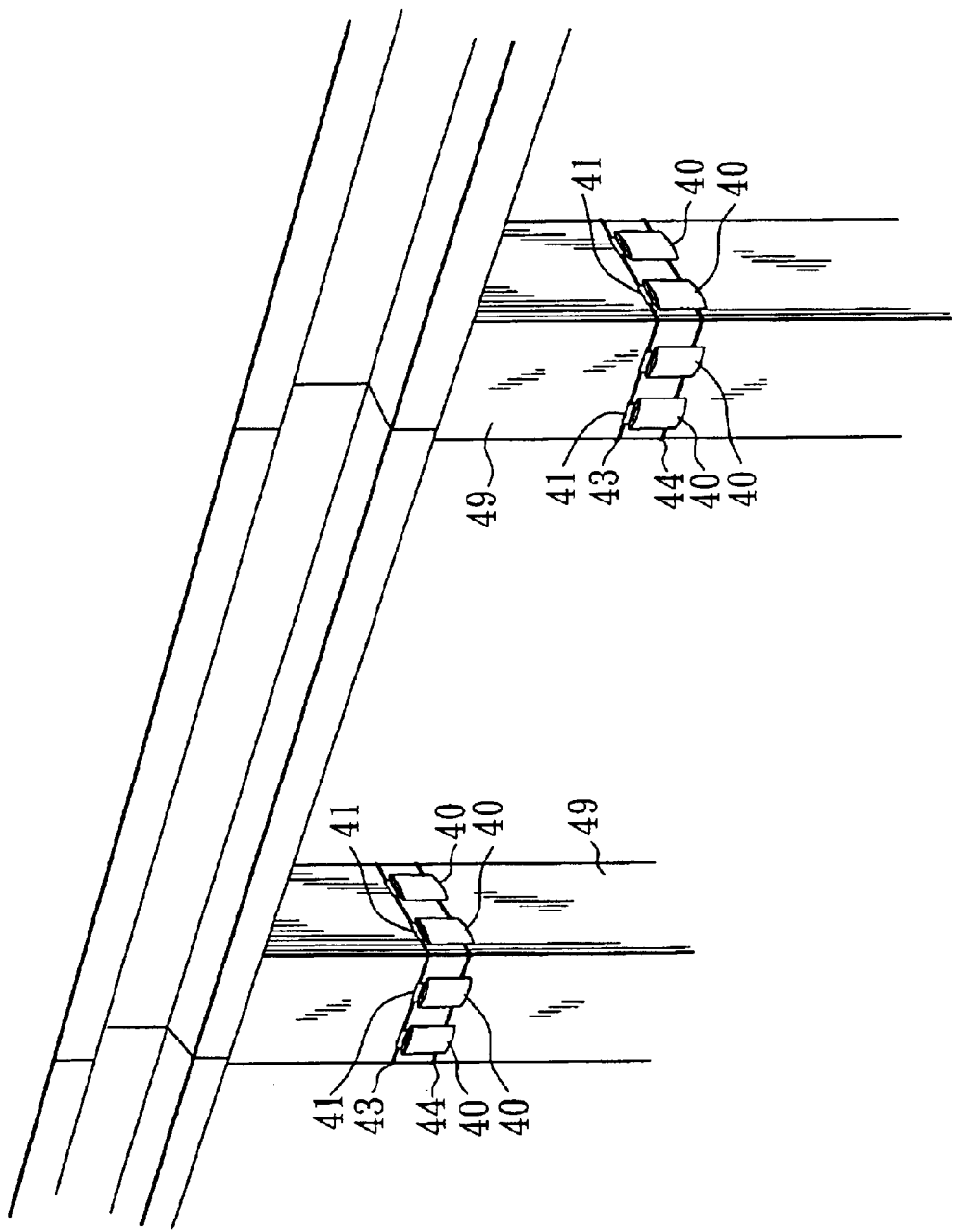
FIG. 6A depicts a second case to use one of the present invented revegetation and greening device on the bridge column.
Figure 6B:
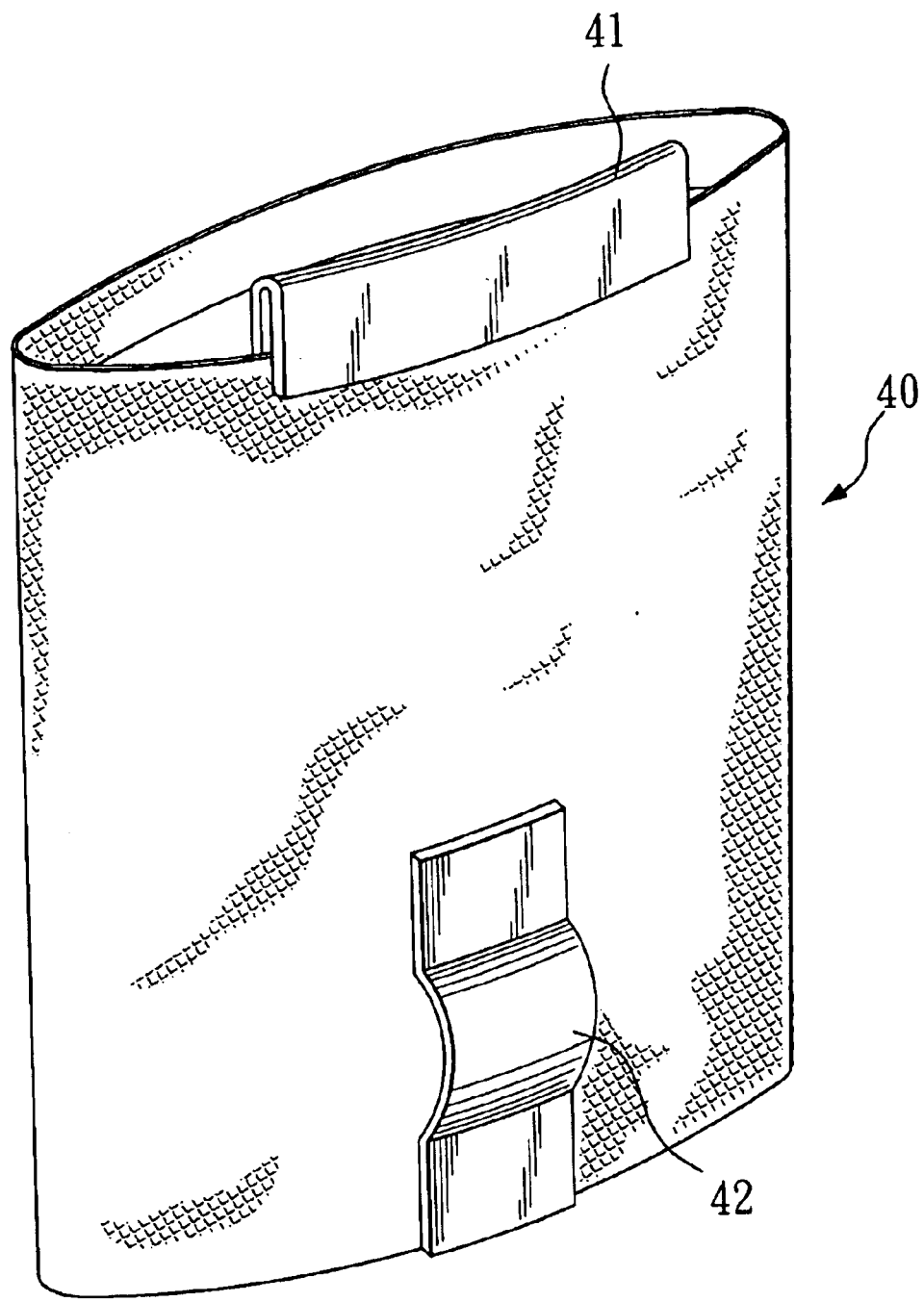
FIG. 6B depicts the back view of the device shown in FIG. 6A.
Figure 7:
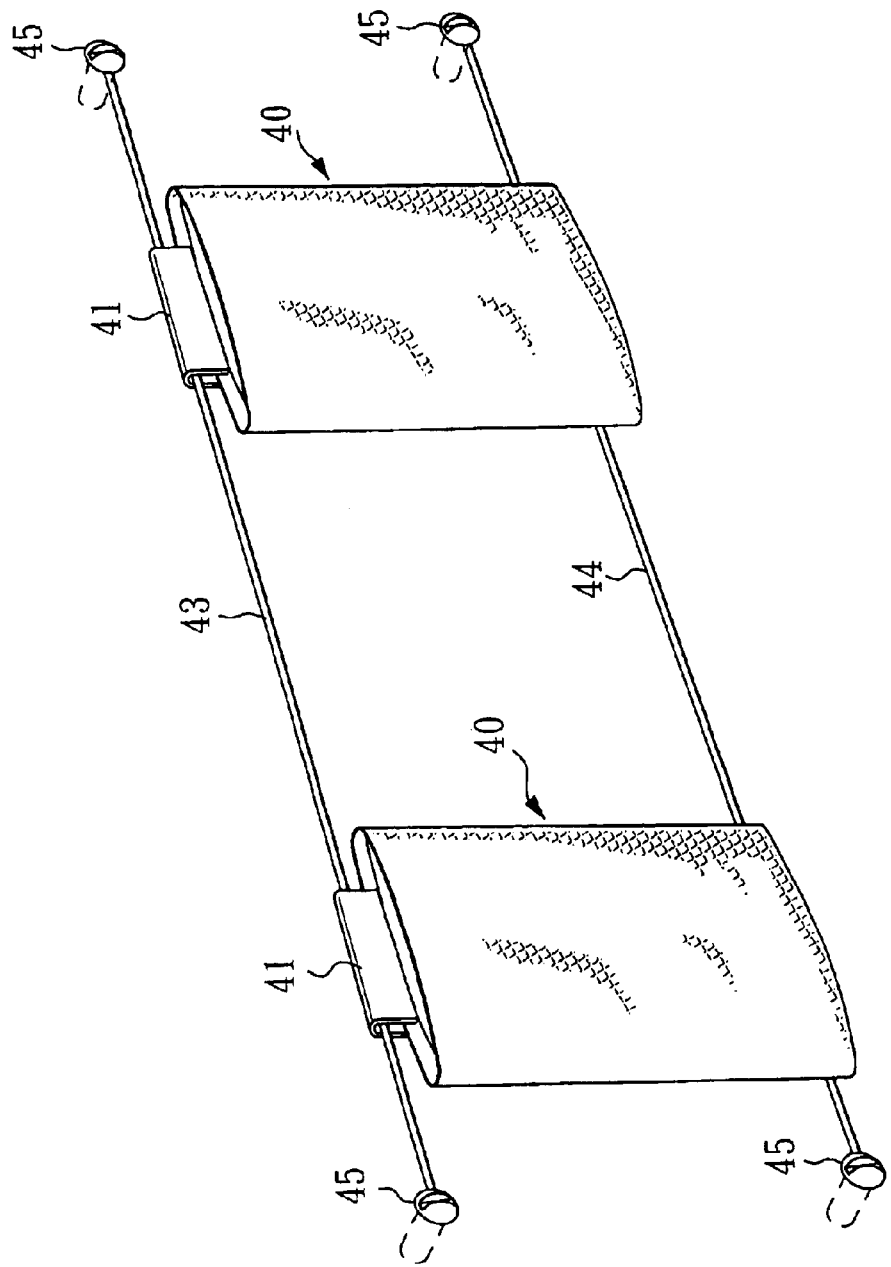
FIG. 7 depicts the present invented revegetation and greening device as shown on FIG. 6A, being fixed on the steep wall by swelling bolts.
Figure 8A:
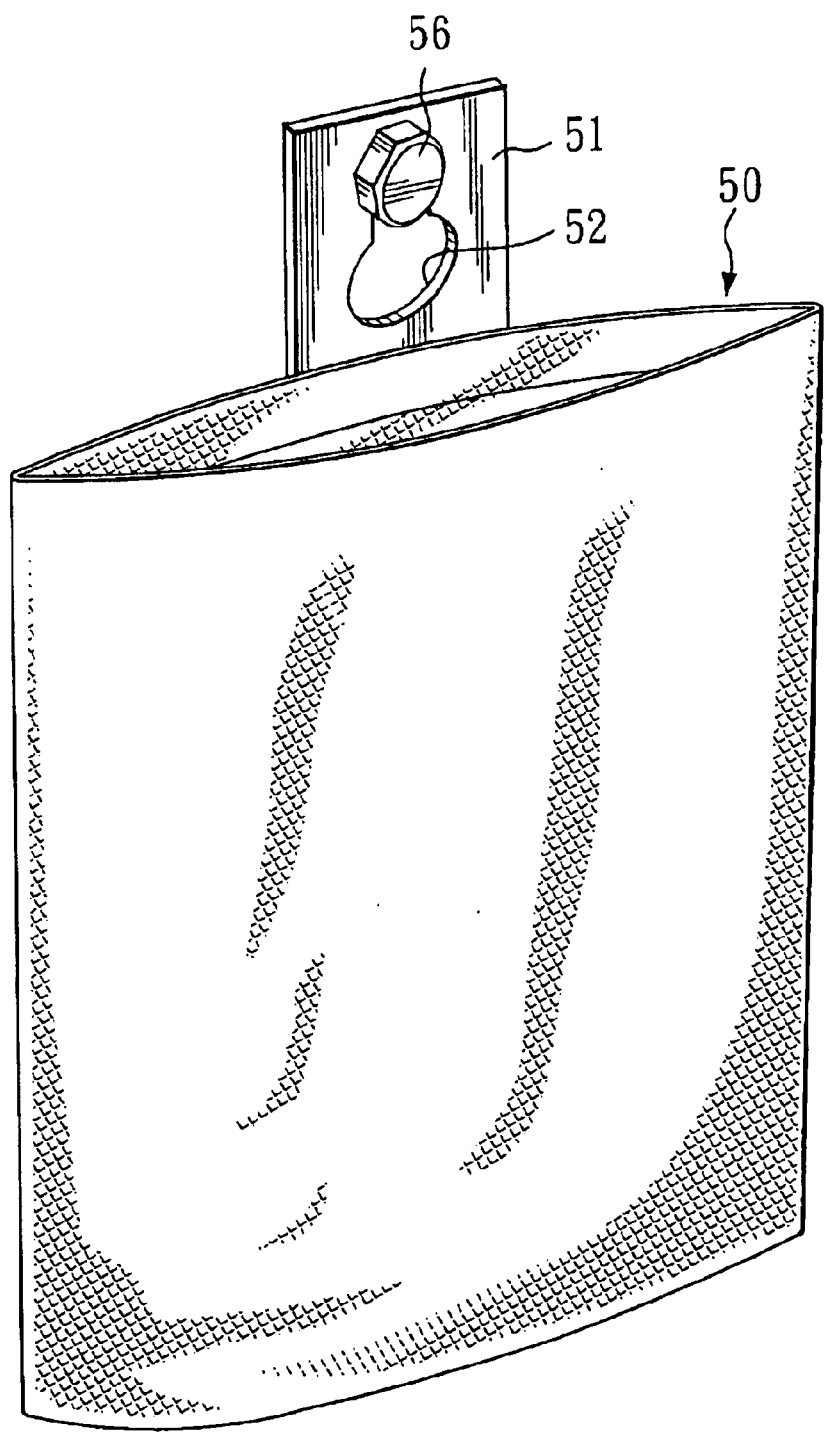
FIG. 8A depicts a third case to use one of the present invented revegetation and greening device on steep wall.
Figure 9:
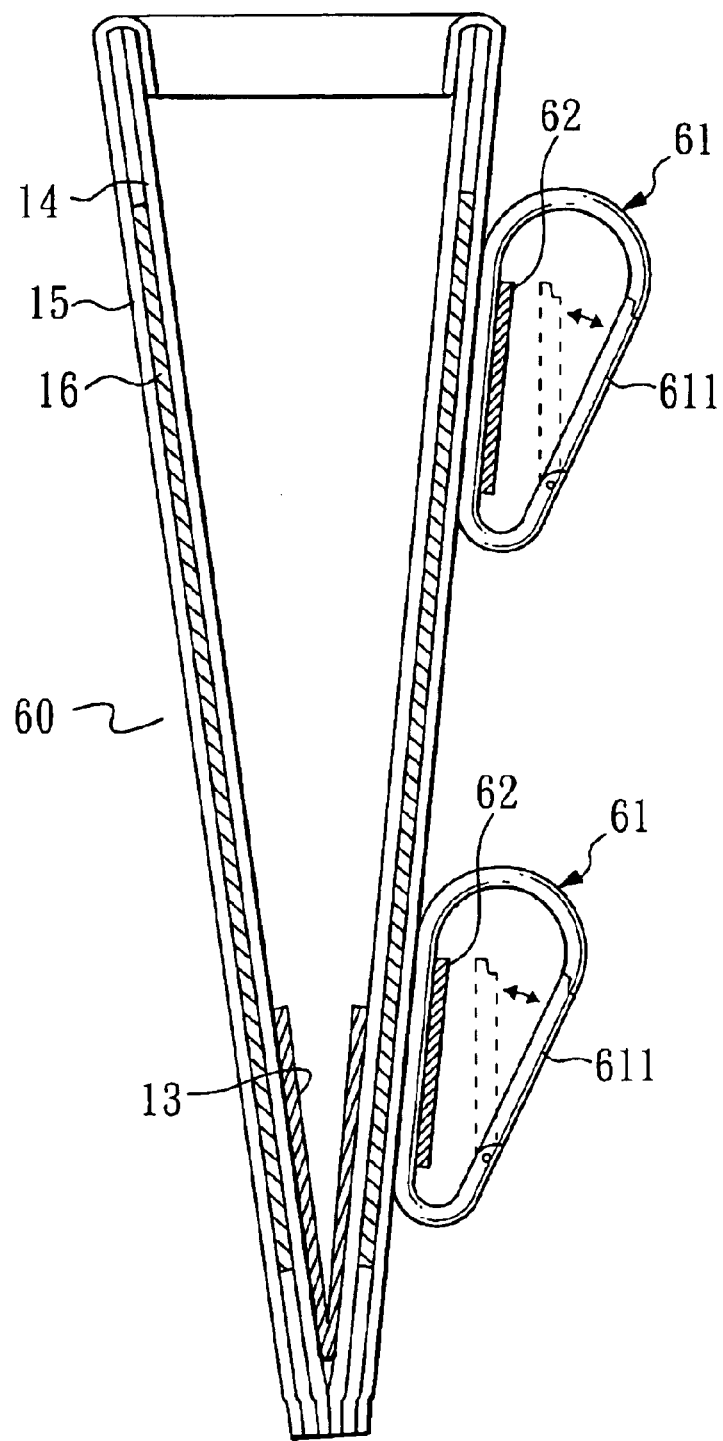
FIG. 9 depicts the side view of a fourth case to use one of the present invented revegetation and greening device.

Besides, without using the synthetic nets or grid, we can also use other structures, such as shown on FIG. 6A, the second case on FIG. 7, the third case on FIG. 8A, or the fourth case on FIG. 9.

The vegetation device 40 shown on 6A and 6B are similar to those shown on FIG. 1 and FIG. 3 except there are two hanging strips 41, 42 respectively sewed on the top and bottom in the back of the device for attaching the device to a concrete surface, such as bridge column 49 or fence, by wire, rope or tape 43,44.

Furthermore, as shown on FIG. 7, the wire, rope, or tape 43, 44 carrying a few vegetation devices that can also been secured on the concrete wall by a bolt or swelling bolt 45. In fact, any device that can fix the wire, rope, or tape 43, 44 on the wall can be used.

Figure 8B:
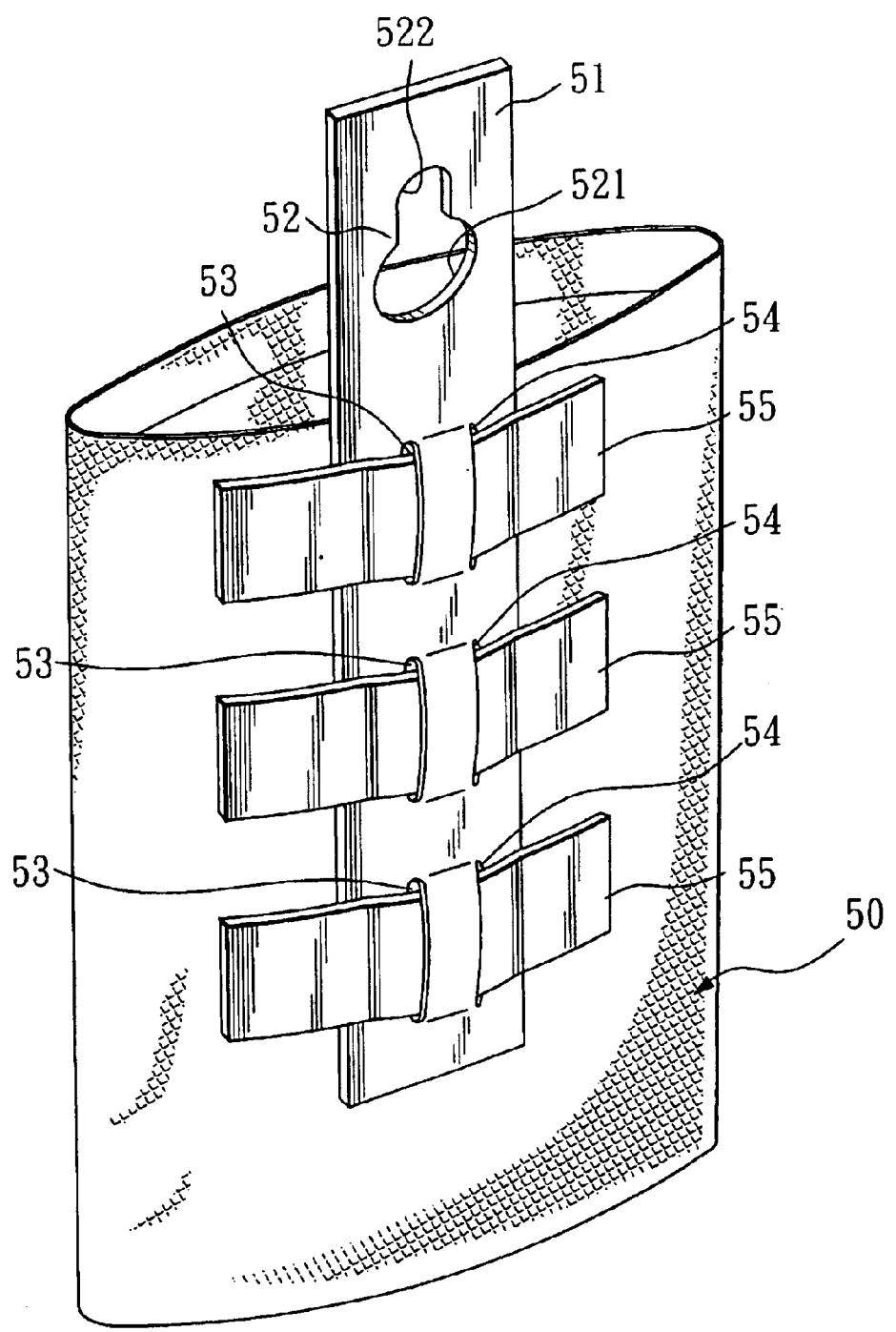
FIG. 8B depicts the back view of the device shown in FIG. 8A.

The vegetation device 50 shown on FIGS. 8A and 8B are similar to those shown on FIG. 1 and FIG. 3 except there is a slender plastic or metal piece 51 with one top hole 52 and several lower holes 53, 54 used to fix itself on the back of revegetation bags or devices by a few synthetic tapes 55; The top hole 52 could be any shape and is composed of a bigger hole 521, and smaller hole 522 in FIG. 8. Again, any device that can fix the top hole 52 on the wall can be used.

The vegetation device 60 shown on FIG. 9 is similar to those shown on FIG. 1 except there are two clip rings 61, arranged at either vertical or horizontal alignment by a few sewed synthetic tapes 62. The two clip rings 61 are the mountain climbing rings that can be easily purchased in the market. The revegetation bags or devices can be fixed on a fence by opening and then closing the push part 611 on clip rings 61.

In conclusion, the present invention relates to a revegetation and greening system that is used to control erosion and to decorate infertile environments or steep structures such as concrete wall or brick walls, concrete surfaces, steep rock or soil slopes, building walls, wood or steel fences, and metal houses. In general, the superiority of the invention are: 1. Multiple fastening points spread out the stress of the weight. 2. The compact size of vegetation device facilitates assembling and transportation. Besides, the triangular longitudinal section can lead the wind current and reduce the wind resistance and possibility of failure in heavy wind conditions. 3. Nonwoven and synthetic geotextiles can not only hold the soil, seed, and vegetation inside, but it can also refill the water from outside. 4. An impermeable water-retaining tank at the sealed bottom to hold water during rains or watering; the dry weed or wood fiber inside can keep inside humidity and temperature stable, and protect it from excessive sunlight. The sprout and survival rate of the vegetation will increase as a result of these methods. 5. The water-holding polymer (or natural water-holding plant gel) can save the water inside the soil and release the water when the soil is dry.

The cases above are depicted in order to provide examples of the present invention. Anyone who understands my spirit of invention can easily make some modifications. Thus, the invention shall include all modifications and variations that may fall within the scope of the attached claims.

| THE MAIN ITEMS AND NUMBERINGS: | |
|---|---|
| 1 | Steep wall |
| 10 | Revegetation device |
| 10' | Revegetation device |
| 11 | Sealed bottom |
| 12 | Top opening |
| 13 | Water-retaining tank |
| 14 | Nonwoven textiles |
| 15 | Synthetic textiles |
| 16 | Thermal isolator |
| 17 | Synthetic textile tapes |
| 18 | Geosynthetic textiles |
| 19 | Nonwoven textiles |
| 20 | Clip-fastening member |
| 21 | Ring |
| 22, 23 | Half rings |
| 25 | Spring type clip-fastening member |
| 26 | Center column |
| 27 | Synthetic textile tapes |
| 30 | Synthetic nets or grid |
| 40 | Revegetation device |
| 41 | Hanging strip |
| 42 | Hanging strip |
| 43, 44 | Wire, rope or tape |
| 45 | Swelling Bolt |
| 49 | Bridge Column |
| 50 | Revegetation device |
| 51 | Slender plastic or metal piece |
| 52 | Top hole |
| 53, 54 | Lower holes |
| 55 | Synthetic textile tapes |
| 56 | Swelling bolt |
| 60 | Revegetation device |
| 61 | Clip rings |
| 62 | Synthetic textile tapes |
| 221, 231 | Free ends |
| 251 | Half piece |
| 252 | Push part |

-continued

THE MAIN ITEMS AND NUMBERINGS:

| | |
|---|---|
| 253 | Teeth part |
| 255 | Twist spring |
| 521 | Bigger hole |
| 522 | Smaller hole |
| 611 | Push part |

I claim:

1. A revegetation and greening system for a structure, said system comprising:
   one or many revegetation devices with an opening on the top and a sealed bottom, and a water-retaining tank at the sealed bottom, the revegetation devices being made of an internal nonwoven layer, an external synthetic textile layer and a layer of thermal isolator disposed between the internal and the external layer;
   internal materials in the revegetation devices including plant seeds or little plants, fertilized soil, and water-holding materials;
   a fastening device for attaching the revegetation devices to the surface of the structure.

2. The revegetation and greening system of claim 1 wherein the revegetation device is provided with a plurality of hanging strips on its back; said fastening device comprises a plurality of ropes or tapes, used for passing through the space between said hanging strips and said revegetation device to connect and fasten said revegetation devices on the structure.

3. The revegetation and greening system of claim 2, wherein said fastening device further comprising a plurality of fixing members that can fix the ropes or tapes on the structure.

4. The revegetation and greening system of claim 3 wherein said fixing members are swelling bolts.

5. The revegetation and greening system of claim 3 wherein said fixing members are hooks.

6. The revegetation and greening system in claim 1 wherein said fastening device comprises an elongate plate piece with one top hole and several lower holes, said plate piece being fixed to the back of said revegetation device by a few synthetic tapes, and a fixing member that can pass through the top hole of the elongate plate piece to fix revegetation device on the structure.

7. The revegetation and greening system in claim 6, wherein said fixing member is a bolt.

8. The revegetation and greening system in claim 6, wherein said fixing member is a hook.

9. The revegetation and greening system in claim 1 wherein said fastening device comprises a plurality of clip rings, arranged at either vertical or horizontal alignment by a few sewed synthetic tapes; the revegetation devices are adapted to be fixed on a fence by opening and then closing the clip rings.

10. A revegetation device for receiving internal materials in the device, the internal materials including plant seeds or little plants, fertilized soil, and water-holding materials; the device having an opening on the top, a sealed bottom and a water-retaining tank at the sealed bottom; the device being made of an internal nonwoven layer, an external synthetic textile layer and a layer of thermal isolator disposed between the internal and external layer.

11. The revegetation device of claim 10, wherein said water-holding materials comprises dry weed, wood fibers, water-holding polymers or the combination thereof.

12. The revegetation and greening system in claim 1, wherein said fastening device comprises a layer of synthetic nets or grids for being fixed on the surface of the structure, and one or more clip-fastening members which just like the clip in the common file holder, said clip containing at least two rings and each ring comprising two half rings that can be opened; and wherein the clip-fastening members can be easily fixed with an over-the-top configuration to the back of the revegetation devices by synthetic textile tapes in order to attach the revegetation devices to said layer of synthetic nets or grids.

13. The revegetation and greening system in claim 1, wherein said fastening device comprises a layer of synthetic nets or grids for being fixed on the surface of the structure, and one or more pairs of spring type clip-fastening members, each pair of spring type clip-fastening members having one of said two members placed on the top and the other placed on the bottom of a center column; the spring type clip-fastening member comprising two teeth type half pieces, wherein each pair of the spring type clip-fastening members with said center column can be easily fixed with over-the-top and under-the-bottom configurations to the back of each revegetation device by synthetic textile tapes in order to attach the revegetation bags or devices to said layer of synthetic nets or grids.

14. The revegetation and greening system of claim 1 wherein the device has a substantially V-shaped longitudinal section, which guides the current and reduces the wind resistance.

15. The revegetation and greening system of claim 1, wherein said water-holding materials comprises dry weed, wood fibers, water-holding polymers or a combination thereof.

* * * * *